No. 656,800. Patented Aug. 28, 1900.
A. ARNOLD.
ADJUSTABLE AXLE BEARING FOR BAND SAWS.
(Application filed Nov. 6, 1899.)
(No Model.) 2 Sheets—Sheet 1.

WITNESSES, INVENTOR.

UNITED STATES PATENT OFFICE.

ANDREAS ARNOLD, OF MUNICH, GERMANY.

ADJUSTABLE AXLE-BEARING FOR BAND-SAWS.

SPECIFICATION forming part of Letters Patent No. 656,800, dated August 28, 1900.

Application filed November 6, 1899. Serial No. 735,949. (No model.)

*To all whom it may concern:*

Be it known that I, ANDREAS ARNOLD, engineer, a subject of the King of Bavaria, residing at 125 Nymphenburgerstrasse, Munich, in the Kingdom of Bavaria and Empire of Germany, have invented certain new and useful Improvements in Adjustable Axle-Bearings for Band-Saws, of which the following is a full, clear, and exact description.

This invention has reference to the axle-bearings of band-saws, and has for its object to insure the bearings of the wheels which are to carry the band-saw proper being accurate. As this accuracy of working cannot be obtained in the usual course, even when the workmanship is most precise, it has been found necessary to make the bearings for these wheels adjustable; but the means for this purpose often are of a very primitive nature, and in very many cases it has been considered sufficient to equalize any differences arising during the working by merely putting small pieces of wood or something of that kind underneath. This is an objectionable expedient.

This invention is illustrated in the annexed drawings, in which—

Figure 1:
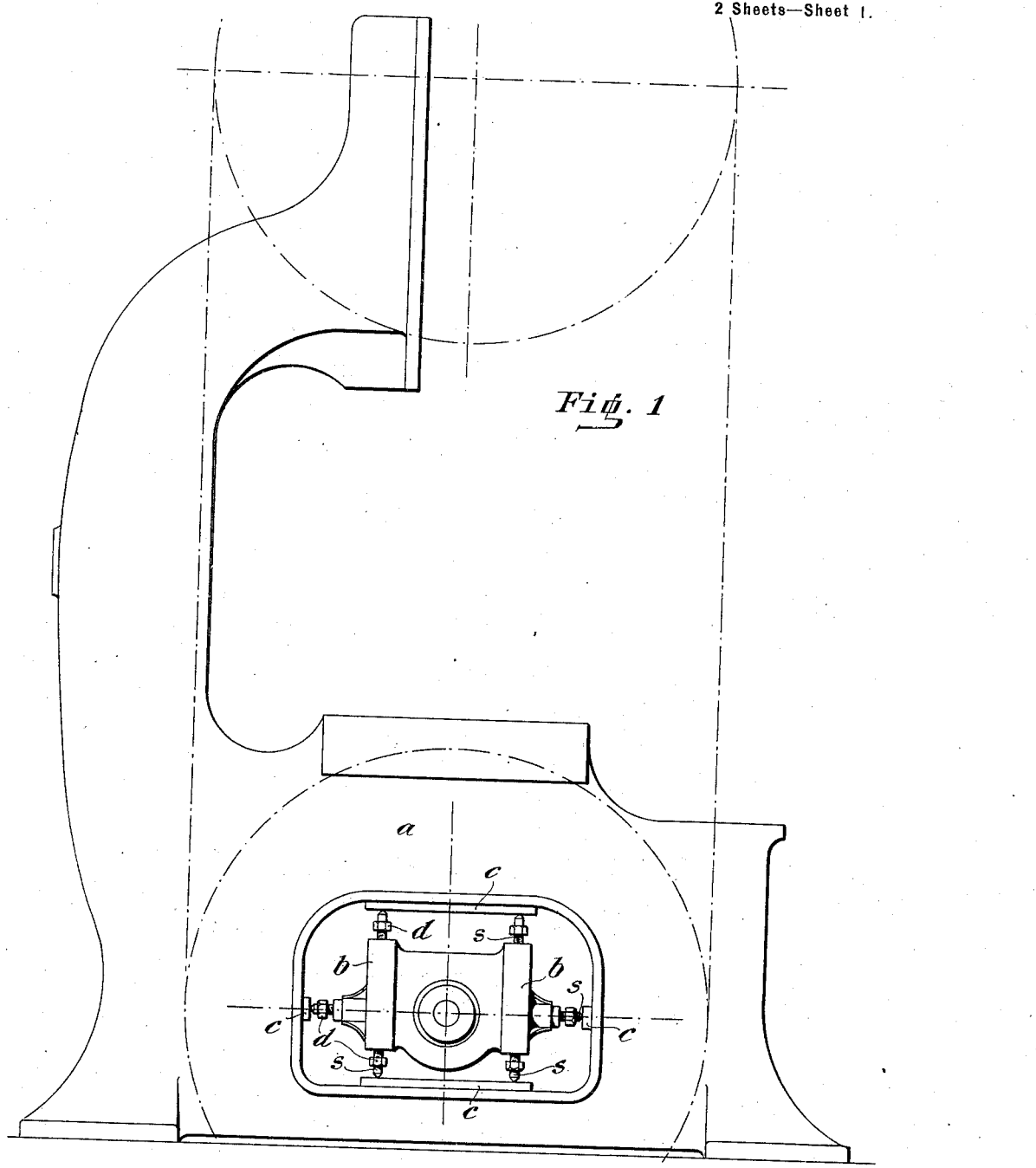
Figure 2:
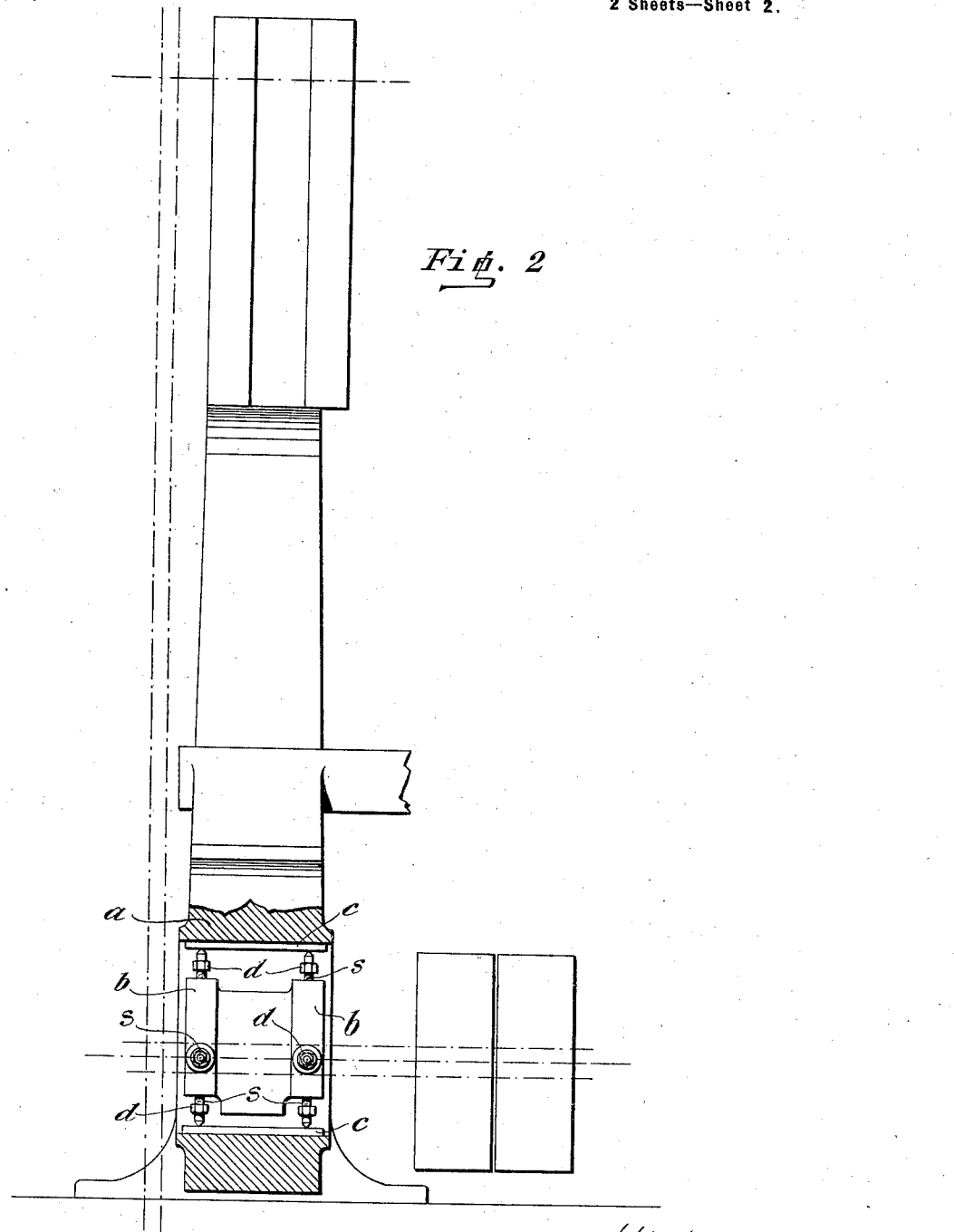

Figure 1 is a side view, and Fig. 2 a front view, of the machine.

In the drawings, $a$ is the body of the machine, having an opening in the lower portion which is intended to receive the bearings. These bearings $b$ are so formed that above and below and at both sides they possess female threads for a number of screws $s$, there being provided in the present instance four at the top, four at the bottom, and two each side. By means of these twelve screws, the points of which are resting in corresponding cavities of the inserted pieces $c$, the bearing $b$ may be tightened in every direction, so that they are absolutely firm in the openings of the body $a$ of the machine. It will be seen that as the screws are adjusted in one direction or the other by means of the hexagonal parts $d$ of the screws $s$ the bearings proper, and hence also the axle, will assume different positions. The upper and lower screws being used mainly for altering the position in a vertical direction, it is easy to change the position in a horizontal direction by means of the screws provided at each side. In this manner the axle may be placed in any position that may be desired, and, moreover, in case of any differences arising during the working the same may be equalized in a simple and easy manner.

What I claim, and desire to secure by Letters Patent, is—

A bearing-block having a plurality of threaded openings therein, screws fitted to said openings and having their outer ends pointed, and said screws having squared portions whereby they may be grasped from the side, substantially in the manner and for the purpose set forth.

In witness whereof I subscribe my signature in presence of two witnesses.

ANDREAS ARNOLD.

Witnesses:
ELLUND WILSON, Jr.,
EMIL HENZEL.